United States Patent
Dehar

[11] 3,724,882
[45] Apr. 3, 1973

[54] TUBE-TO-HOSE CONNECTION

[75] Inventor: David C. Dehar, Dearborn Heights, Mich.

[73] Assignee: Ford Motor Company, Dearborn, Mich.

[22] Filed: May 10, 1971

[21] Appl. No.: 141,878

[52] U.S. Cl. ............... 285/243, 285/257, 285/255, 285/322
[51] Int. Cl. .............................. F16l 21/06
[58] Field of Search ...... 285/243, 255, 256, 257, 322, 285/323, 319

[56] References Cited

UNITED STATES PATENTS

| | | | |
|---|---|---|---|
| 2,280,892 | 4/1942 | Cowles | 285/243 |
| 2,446,599 | 8/1948 | Knaggs | 285/243 |
| 2,784,987 | 3/1957 | Corcoran | 285/319 |
| 3,096,999 | 7/1963 | Ahlstone et al. | 285/322 X |
| 3,222,091 | 12/1965 | Marshall | 285/243 X |
| 3,394,950 | 7/1968 | Jensen | 285/322 X |
| 3,454,290 | 7/1969 | Tairraz | 285/323 X |
| 3,574,355 | 4/1971 | Oetiker | 285/256 X |

Primary Examiner—Reinaldo P. Machado
Assistant Examiner—Wayne L. Shedd
Attorney—John R. Faulkner and Roger E. Erickson

[57] ABSTRACT

A nonthreaded coupler for connecting a flexible hose to a relatively rigid tube or nipple. The coupler includes an inner sleeve or clamp member positioned about and secured to the tube near its end. The clamp member has a plurality of axially extending fingers that form a cage to receive the end of the hose. An outer sleeve, positioned about the inner sleeve, is axially movable relative to and engagable with the inner sleeve to constrict the opening of the cage and to compress the hose wall between the clamp member fingers and the tube.

6 Claims, 4 Drawing Figures

PATENTED APR 3 1973

3,724,882

INVENTOR
DAVID C. DEHAR
BY John P Faulkner
Roger E Erickson
ATTORNEYS

TUBE-TO-HOSE CONNECTION

BACKGROUND AND SUMMARY OF THE INVENTION

Present automotive and internal combustion engines provide numerous potential uses for reliable and low-cost nonthreaded hose and tube connectors.

The invention to be described herein provides a connector such as mentioned above which is low cost and reliable in addition to being exceptionally suitable for high volume production. Further, it provides a connector in which the hose clamping portion is in a fixed axial position relative to the tube regardless of the extent of insertion of the tube into the hose, thus assuring optimum clamping of the hose against the tube. The invention also provides positive locking means to retain the clamping portion of the connector in a closed position without relying solely on friction between the elements. Still further, a release means is provided which permits rapid and convenient unclamping of the connector.

Of particular interest in high volume applications is the construction of the connector which permits the entire assembly to be mounted on the tube prior to joining the hose and the tube. The hose end is then inserted into the connector and about the tube requiring a minimum reliance upon operator technique. Further, the invention provides positive stops or abutments for all positions of each connector element and for the hose and tube ends.

A hose and tube connector constructed in accordance with this invention includes a clamp member or inner sleeve having a plurality of axially extending fingers positioned about the end segment of the tube. The clamp member and tube segment include mutually engageable retaining means to fasten the clamp member about the tube at a predetermined axial position relative to the tube. The hose is insertable into the clamp member fingers and about the tube end. An outer sleeve is positioned about the clamp member and is axially movable relative to the clamp member to constrict the fingers about the hose and to compress the hose wall between the clamp member and the tube.

DETAILED DESCRIPTION OF THE PREFERRED EMBODIMENT

Figure 3:
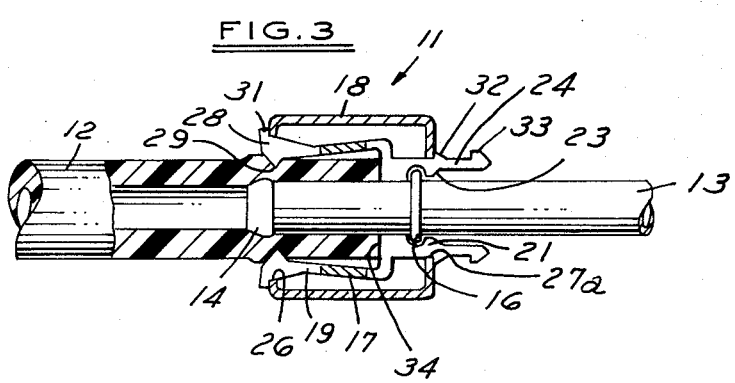
FIG. 3 of the drawings is a cross sectional view showing the hose and tube connection in an assembled and locked relationship.
Figure 4:
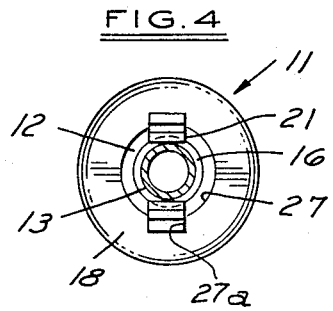
FIG. 4 is a view taken along line 4—4 of FIG. 3.

In the drawings, numeral 11 refers to a connector for joining a rubber, plastic, or similar hose 12 to a relatively rigid tube 13. The tube has an enlarged, conically tapered end or head 14 with a minimum diameter less than the normal outer diameter of the tube. The conical surface facilitates the insertion of the tube into the hose member. The rear portion of the head 14 acts as an abutment or bead which when the connector is in a clamped position as shown in FIG. 3 prevents the hose from being pulled off or withdrawn from the tube end. Spaced from the enlarged, tapered end 14 is a second bead 16 which cooperates with an element of the connector 11 to fix the axial position of the connector relative to the tube and hose.

The connection 11 includes an inner sleeve or clamp member 17 and an outer sleeve 18. The clamp member includes a plurality of fingers 19 extending axially toward the end of the tube 13. The fingers form a generally cylinder cage which surrounds the tube adjacent the head 14. When the connection is effected the hose 12 is placed about the end of tube 13 and within the fingers 19.

The clamp member 17 includes a pair of cantilevered members or arms 21 which engage the tube and include recesses 22 that snap over bead 16 of the tube to retain the clamp member in a fixed or predetermined axial position on the tube 13. The placement of the clamp member onto the tube is aided by ramp surfaces 23, which when engaged by bead 16 cause the members 21 to spread so that the recesses 22 may be axially positioned over the bead. The end portions 24 of the two cantilevered members 21 are radially spaced from the tube to permit radially inward deformation of the members and movement of the outer sleeve 18 to an unclamped position.

Figure 1:
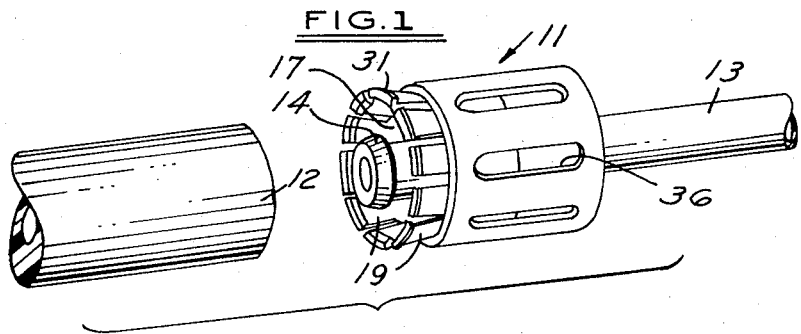
FIG. 1 of the drawings is a perspective view of a connector in an open position mounted on the end of a tube and about to receive the end of a hose.
Figure 2:
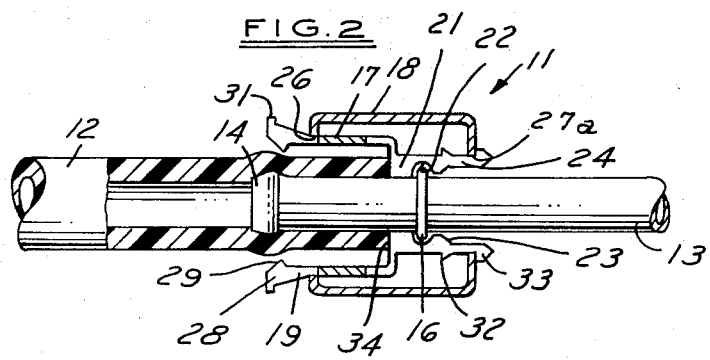
FIG. 2 is a cross sectional view of the hose and tube connector following insertion of the hose into the clamp member, but prior to constricting the clamp member about the hose.

Outer sleeve 18 is positioned about the clamp member 17 and has a circular opening 26 at one end that engages the axial fingers 19 and a second opening 27 at the other end. The second opening is circular with radial enlargements 27a to accommodate members 21. The axial fingers include wedge or ramp portions 28 and inwardly extending teeth 29. The outer sleeve is slidable in a leftwardly direction from the position of FIG. 1 to the position of FIG. 2, causing the fingers 19 or the cage which they define to constrict about the hose so that the teeth securely grasp and retain the hose and compress the hose wall against the tube member as shown in FIG. 3. The hose is most constricted just prior to the head 14 to achieve maximum sealing and retention. A plurality of abutments on the fingers prevents the sleeve from displacement past the maximum constriction position. Tabs 32 formed on the cantilevered members acts as positive latch means or lock means to retain the outer sleeve in the fully locked maximum constriction position as shown in FIG. 3. The connection may be released by compressing the cantilevered members 21 toward or against the tube, so that the tabs 32 no longer engage the outer sleeve and permit it to be moved rightwardly into the position as shown in FIG. 2. An additional pair of tabs 33 on the end of the cantilevered members or arms 21 prevent overdisplacement or unintentional removal of the outer sleeve from its position about the inner sleeve or clamp member 17.

Abutments 34, which are portions of the cantilevered members 21, are engageable with the end of the hose 12 when it is fully inserted into the clamp member and provides a positive stop for the hose during its assembly.

The initial assembly operation is positioning the outer sleeve 18 over the clamp member 17. The connector assembly 11 is then pushed onto the end of the tube until it snaps in place over the bead 16 as shown in FIG. 2 of the drawings. The hose end is next inserted over the end of the tube and into the cage formed by the fingers 19 of the clamp member until the end of the hose engages the abutment 34 of the clamp member. The hose is secured by moving the outer sleeve member 18 leftwardly from its position as shown in the FIG. 2 of the drawings to the position as shown in FIG. 3. In the later position, the fingers are wedged radially inwardly so that the teeth 29 bite into the hose and compress it against the tube. It may be noticed that the point of maximum constriction of the clamp member is just slightly before the enlarged tube head 14 so that an axial force on the hose and tube assembly or connection will not result in separation of the assembly.

The outer sleeve 18 has a series of axially disposed slots 36 that together with the spaces between the fingers 19 of the clamp member permit visual inspection of the extent of insertion of the hose into the connector when the assembly is fully connected.

The connector 11 may be constructed of molded plastic or of a stamped resilient metal.

Modifications and alterations will occur to those skilled in the art which are included within the scope of the following claims.

I claim:

1. A hose and tube connection comprising:
   a tube,
   a clamp member having an annular portion, a plurality of fingers extending axially from said annular portion and about said tube, said fingers being inherently resiliently biased toward open positions,
   retaining means formed in said clamp member and said tube being mutually engageable to locate said clamp member about said tube at a predetermined axial position of said tube, said clamp member retaining means being resiliently displaceable to permit positioning of said clamp member relative to said tube,
   a hose being flexible relative to said tube having an end portion receivable within said clamp fingers and about said tube,
   a sleeve positioned about said clamp member, said sleeve being slidable in one axial direction relative to said clamp member to constrict said fingers about said hose and to compress said hose between the clamp member and the tube, said sleeve being slidable in the other axial direction to release said fingers and said hose.

2. A hose and tube connection according to claim 1 and
   wedge portions forming the end portions of said fingers,
   said sleeve having an opening engagable with said wedge portions and axially movable relative thereto to constrict or release said fingers about said hose.

3. A hose and tube connection according to claim 1 and
   a portion of said clamp member forming an abutment means to determine the maximum extent of axial insertion of said hose within the fingers and about the tube.

4. A hose and tube connection according to claim 1 and
   lock means formed in said clamp member comprising abutments having ramp sides and sides substantially normal to the axis of the annular portion, said substantially normal sides being engageable with said sleeve to slidably lock the sleeve in a constricting position about the clamp member fingers,
   said lock means comprising a plurality of arms extending axially opposite said fingers, the end portions of said arms being radially spaced from said tube, said arms being radially deformable to release and permit axial movement of said sleeve thereby relieving the constriction of the clamp member fingers.

5. A hose and tube connection comprising:
   a tube,
   a clamp member having a plurality of fingers extending axially about said tube,
   a bead formed on said tube axially spaced from its end,
   a recess formed in aid clamp member,
   said bead being receivable within said recess to locate and retain said clamp member in a fixed axial position on said tube,
   said fingers forming an axially opening cage adjacent the end of said tube,
   a hose having an end insertable and receivable within said cage,
   abutment means formed within said cage to determine the maximum extent of axial insertion of said hose into said clamp member and about said tube,
   said fingers including wedge portions adjacent the cage opening,
   a sleeve received about said clamp member being axially movable relative thereto,
   a portion of said sleeve member being engageable with said wedge portions to deform said fingers and correspondingly constrict the cage opening as the sleeve member is axially advanced along the clamp member,
   lock means formed in said clamp member engagable with said sleeve to lock the sleeve in a constricting position about the clamp member fingers,
   said lock means comprising a pair of arms extending axially opposite said fingers,
   the end portions of said pair of arms being radially spaced from said tube,
   said pair of arms being radially deformable to release and permit axial movement of said sleeve thereby relieving the constriction of the cage opening.

6. A hose and tube connection according to claim 5 and
   a plurality of radially inwardly extending teeth formed on said fingers engagable with said hose,
   an enlarged head formed on said head,
   said teeth being located adjacent said enlarged head and to the side thereof away from the end of the tube when the connection is in a locked, assembled relationship.

* * * * *